United States Patent [19]

Blaauw et al.

[11] Patent Number: 5,617,561
[45] Date of Patent: Apr. 1, 1997

[54] MESSAGE SEQUENCE NUMBER CONTROL IN A VIRTUAL TIME SYSTEM

[75] Inventors: David T. Blaauw, Austin, Tex.; Nimish S. Radia, Johnson City; Joseph F. Skovira, Binghamton, both of N.Y.

[73] Assignee: International Business Machines Corporation, Armonk, N.Y.

[21] Appl. No.: 363,428

[22] Filed: Dec. 22, 1994

[51] Int. Cl.⁶ .................. G06F 9/455; H04J 3/24
[52] U.S. Cl. .................. 395/500; 379/88; 379/96; 379/90; 379/98; 395/200.01; 395/311; 395/201; 364/918; 340/825.8; 340/826; 370/394; 370/409
[58] Field of Search ................ 395/500, 550, 395/650, 182.08, 182.02, 311, 700, 800, 200.06, 200.01, 200.14, 831, 200.16, 200.15; 370/60, 85.15, 85.13, 85.9, 94.1, 92, 94.3, 54; 340/825.8, 826, 825.5; 379/201, 207, 91–98; 371/37.1; 364/408, 401 R, 918

[56] References Cited

U.S. PATENT DOCUMENTS

| | | | |
|---|---|---|---|
| 4,359,778 | 11/1982 | Lee | 375/13 |
| 4,594,655 | 6/1986 | Hao et al. | 364/200 |
| 4,718,002 | 1/1988 | Carr | 395/200.06 |
| 4,748,620 | 5/1988 | Adelmann et al. | 370/94 |
| 4,893,302 | 1/1990 | Hammady et al. | 370/60 |
| 4,939,724 | 7/1990 | Ebersole | 370/94.1 |
| 5,195,130 | 3/1993 | Weiss et al. | 379/98 |
| 5,216,675 | 6/1993 | Melliar-Smith et al. | 370/94.1 |
| 5,222,130 | 6/1993 | Pflueger et al. | 379/399 |
| 5,224,095 | 6/1993 | Woest et al. | 370/85 |
| 5,243,595 | 9/1993 | Woest et al. | 370/85.13 |
| 5,245,616 | 9/1993 | Olson | 370/60 |
| 5,249,184 | 9/1993 | Woest et al. | 370/85.8 |
| 5,250,943 | 10/1993 | Childs et al. | 340/825.8 |
| 5,255,268 | 10/1993 | Cato et al. | 370/94.1 |
| 5,260,933 | 11/1993 | Rouse | 370/14 |
| 5,398,242 | 3/1995 | Perlman | 370/85.13 |
| 5,442,772 | 8/1995 | Childs et al. | 395/500 |
| 5,485,370 | 1/1996 | Moss et al. | 395/200.01 |

OTHER PUBLICATIONS

David R. Jefferson, Virtual Time, ACM Transactions on Programming Languages and Systems, vol. 7, No. 3, Jul. 1985, pp. 405–425.

Y.B. Lin et al, Determining The Global Virtual Time in a Distributed Simulation, International Conference on Parallel Processing Jan. 1990, pp. 201–209.

Primary Examiner—Kevin J. Teska
Assistant Examiner—Jacques Louis-Jacques
Attorney, Agent, or Firm—Baker, Maxham, Jester & Meador

[57] ABSTRACT

In a virtual time system employing parallel processing nodes, processor nodes communicate with each other by sending messages. Each message between any pair of processing nodes is labeled with a sequence number, which allows the system to determine which messages are "in-transit" at any point in time. In the invention, sequence numbers are drawn in a sending processing node from a finite range according to a method that permits them to be reused through time while providing unique sequence numbers with respect to other messages sent since a last received sequence number provided by a receiving processing node. The last received sequence number is the message sequence number in a last message sent by the sending processing node to the receiving processing node.

31 Claims, 3 Drawing Sheets ions Ser. No. 07/993,142, filed Dec. 18, 1992, for "COMMON BREAK POINT IN VIRTUAL TIME LOGIC SIMULATION FOR PARALLEL PROCESSORS", commonly assigned herewith and incorporated herein by reference.

MESSAGE SEQUENCE NUMBER CONTROL IN A VIRTUAL TIME SYSTEM

CROSS REFERENCE TO RELATED APPLICATIONS

This paper is related to co-pending U.S. patent application Ser. No. 07/993,142, filed Dec. 18, 1992, for "COMMON BREAK POINT IN VIRTUAL TIME LOGIC SIMULATION FOR PARALLEL PROCESSORS", commonly assigned herewith and incorporated herein by reference.

BACKGROUND OF THE INVENTION

The invention relates generally to management and synchronization of message traffic in a virtual time system, and deals more particularly with managing message sequence numbers during processing in a virtual time system. The invention is presented in the specific context of logic simulation performed on parallel processors operating on a virtual time basis.

In a "virtual time" system, multiple processors operate in parallel to perform specific processing tasks whose results are integrated into a system result. The individual processors of the system are synchronized by global virtual time (GVT). Jefferson defines GVT as the least of: all local virtual times, and the virtual send times of all unprocessed messages transmitted between the parallel processors. D. R. Jefferson, "Virtual Time", *ACM Transactions on Programming Languages and Systems*, pp. 404–425, July 1985.

An exemplary virtual time system comprising a plurality of processor nodes with means for calculating GVT is described in U.S. Pat. No. 5,250,943, commonly assigned herewith, and incorporated herein by reference.

Typically, any processor of a virtual time system may ask for calculation of GVT. In response to such a request, each processor reports to the requesting processor a minimum virtual time taken from the minimum of the LVT at the processor and the virtual time of any message that the processor has sent to another processor without yet having received an acknowledgment. Lin and Lazowska propounded an algorithm for determining GVT in a virtual time system comprising a message-passing, multi-processor environment. Y. Lin and E. D. Lazowska, "Determining the Global Virtual Time in a Distributed System", in *Proceedings of the International Conference on Parallel Processing*, pp. 201–209, 1990. In this algorithm, an initiator process broadcasts a START message causing every other process to compute its minimum virtual time. The computed minima are returned to the initiating process, which then computes the GVT as the minimum of the reported minima. The authors observed the transient message problem which arises from the inability to directly access in transit messages in the system. In the proposed solution to the transient message problem, a sequence number is appended to every message sent from processor p to processor q for all processors p in the set of processors making up the virtual time system. As taught in the Lin et al article, every receiving processor maintains for each sending processor from which it receives messages, the sequence number of some last received message (hereinafter the "Last Received Sequence Number"). Then, when a receiving processor detects the START message, it sends to each sending processor from which it has received messages since the last GVT calculation, a message identifying itself, giving its LVT, and giving the Last Received Sequence Number for that sending processor. Every sending processor thus is able to identify messages which it has sent that are in transit when GVT is calculated and to account for those in transit messages when determining its own local minimum. Manifestly, this algorithm presupposes the maintenance of a respective number sequence for every sending/receiving processor pair.

A general object of the present invention is to improve a virtual time system that utilizes sequence numbers.

Another object of this invention is to provide sequence number control in a virtual time system.

A further objective of this invention is to provide each message between any part of processors in a virtual time system with a unique sequence number.

SUMMARY OF THE INVENTION

In virtual time systems, processors communicate with each other by sending messages. Each message is labeled with a sequence number, which allows the system to determine which messages are in transit at any point in time. Theoretically, sequence numbers could be drawn from an infinite range, allowing each message to have a sequence number which is unique with respect to all messages sent during system operation. In actual implementation, however, sequence numbers must be drawn from a finite range and reused through the time of operation of the system. The invention provides for control of sequence numbers that are drawn from a finite range, insures that all in-transit messages between two processors have unique sequence numbers, minimizes the need for synchronization of sending and receiving processors, and allows for efficient and accurate comparisons of sequence numbers despite reuse of the numbers.

The invention is based upon the inventors' critical realization that a "valid window" can be defined over a finite range of numbers in such a way as to generate sequence numbers without duplicating the sequence number of an in-transit message. In the invention, the valid window is delimited at the low end by a "LeastValidNumber" and at a high end by a "HighestValidNumber". The size of the valid window is by definition the size of the finite range from which sequence numbers are drawn. The invention synchronizes relocation of the valid window with respect to the finite range with GVT calculations.

DETAILED DESCRIPTION OF THE PREFERRED EMBODIMENTS

Figure 1:
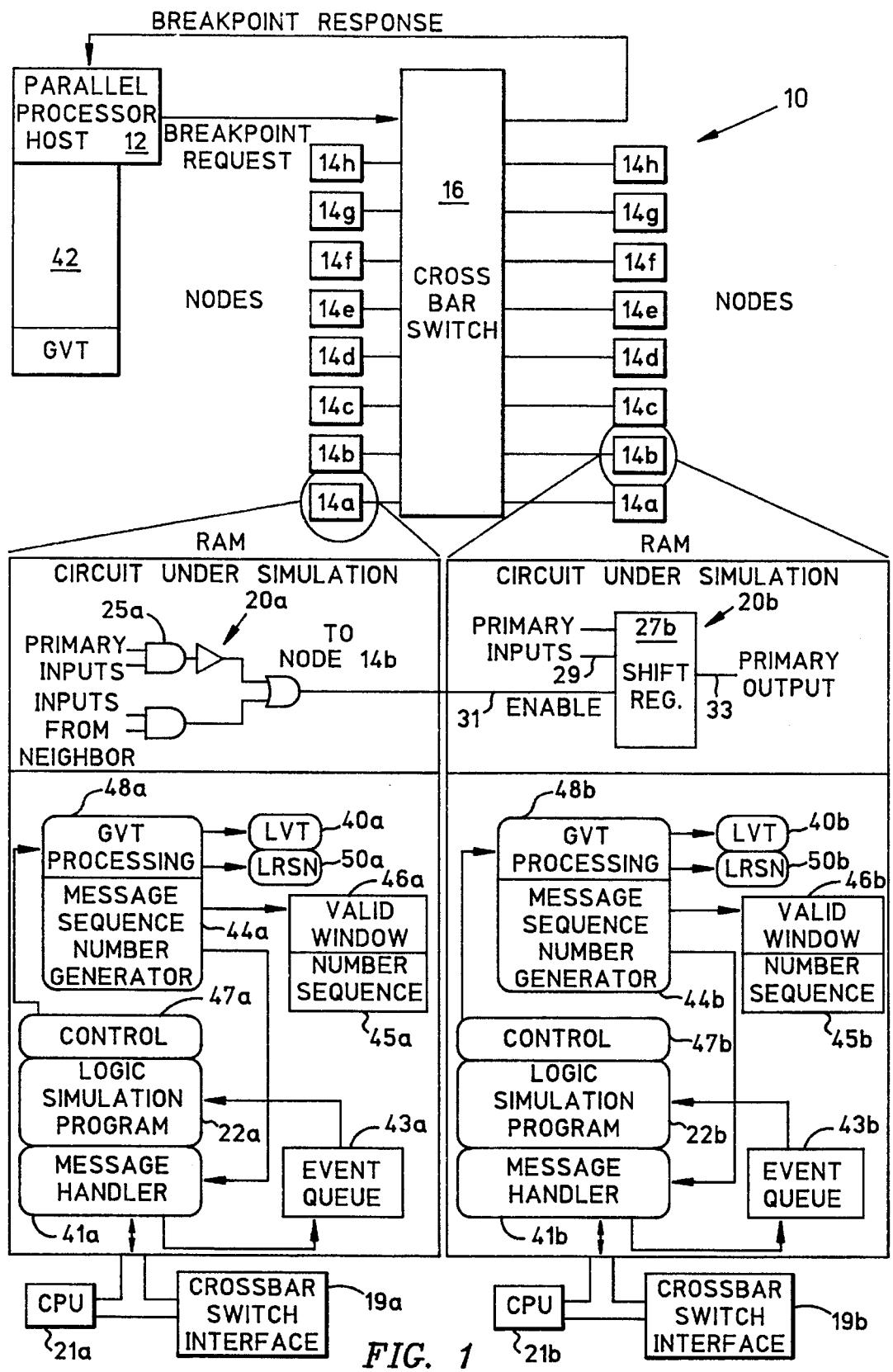
FIG. 1 is block diagram of a virtual time system in the form of a computer network comprising a host computer and parallel processors. The network specifically is for simulation of a logic circuit.

Referring now to the figures in detail wherein like reference numerals indicate like elements throughout the several views, FIG. 1 illustrates a virtual time system according to the present invention. The virtual time system is specifically embodied as a distributed logic simulator generally designated as 10 and comprising a host computer 12 with a known communication facility (not shown), a multiplicity of processing nodes 14a–h, each with a respective known communication facility (not shown), and a known crossbar switch 16 which interconnects the host computer to the parallel processors and the parallel processors to each other. By way of example, the host computer and each of the parallel processors is provided in the form of a RISC/6,000 (R) work station. The crossbar switch and interface 19 may comprise the multi-sender/switching network and related interfaces described in the Incorporated U.S. Pat. No. 5,250,943. Alternatively, crossbar switch and interface 19 may be as described in U.S. Pat. No. 4,929,940, which is hereby incorporated by reference.

Each of the processing nodes simulates a respective portion 20a–h of a logic circuit, although for simplicity only two parallel processing nodes 14a, b and two of the corresponding logic circuits 20a, b are shown in detail in FIG. 1, and only simple logic is shown. The simulation of logic portion 20a is provided by a logic simulation program 22a which executes on a processor of the processing node 20a. The processor includes CPU 21a. In FIG. 1, "primary inputs" are inputs to the circuit being simulated and are generated externally of the system. "Inputs from neighbor" refers to inputs provided by outputs from another processing node. "Primary outputs" are outputs generated by the simulated circuit and can be observed externally of the simulated circuit. "Outputs to neighbors" refers to outputs supplied to another node as "inputs from neighbor". The actual logic simulation performed by each of the logic simulations programs 22 alone can be that described in the "Virtual Time" article cited above, and is not part of the present invention. Typically, each of the logic simulation programs 22 proceeds at its own pace, predicting inputs when needed and not available from another known processing node. Different types of prediction techniques are known from the prior art as described above.

Each of the processing nodes exhibits "Local Virtual Time" (LVT) which indicates the point in time to which respective logic simulation has advanced. Each of the logic simulation programs 22 establishes the LVT for the respective node by the progress of its simulation and maintains a record of the current LVT in a control block 40. It should be noted that if a predicted input for processing node was incorrect as evidenced by an actual input subsequently provided by another (neighbor) node, then the logic simulation LVT for the node may be rolled-back to the point where the input was required and re-executed form this point onward with the actual input. The LVT is usually different at each node. Also, as described in the cited Jefferson article, the host records in a control block 42 "Global Virtual Time" (GVT) which is a minimum time to or beyond which all processing nodes have advanced. As a general rule, once all processing nodes have advanced to or beyond a certain time, then none of the processing nodes will need to roll-back before this time because all will have the actual inputs available at this time. Thus, GVT is a time at which the processing conditions for all processing nodes are valid.

Primary inputs and inputs from neighbors are received by a processing node in messages from the processor host and other processing nodes. Each processing node therefore includes a message handler 41, typically in the form of task executing at the processing node. The message handler processes outgoing messages from the node which are placed on the crossbar switch interface for transmission to a receiving processing node. Message handler 41 further receives incoming massages from sending processing nodes and places them on a message queue 43 ("event queue" according to Jefferson). Message handler 41 receives message sequence numbers from a message sequence number generator 44 that obtains sequence numbers for messages sent by the processing node from a finite number sequence 45 that is viewed through a valid window 46.

As the logic simulation program 22 and any processing node executes in response to events in messages on the event queue 43, a logic simulation control program 47 monitors a number of conditions to determine when GVT processing 48 should be invoked. At the invocation of GVT processing 48, the invoking processing node sends the START message. When the START is received at any processing node, the control program 47 at that node invokes GVT processing 48 which includes the in-transit processing according to the Lin/Lazowska algorithm described above. In this regard, it is recalled that GVT processing in response to a START message results in sending a message to every processing node from which the processing node has received messages, each message identifying the receiving node, providing the LVT of the receiving node, and the Last Received Sequence Number (LRSN) for the node to which the message is sent. For example, assume the processing node 14b in FIG. 1 has been receiving messages from processing node 14a. In this case, a data block 50 containing the LRSN from processing node 14a is maintained in data block 50b. When processing node 14b receives the START message, it returns a message to processing node 14a that includes contents of data block 50b ($LRSN_a$).

When the message containing $LRSN_a$ is received at processing node 14a, it is provided to the message sequence number generator for the processing node 14a for the adjustment of the valid window 46a according to the invention. This may be performed, for example, by the message handler 41 a routing the message directly to the generator 44a, keying the routing based upon the contents of the message.

Figure 2:
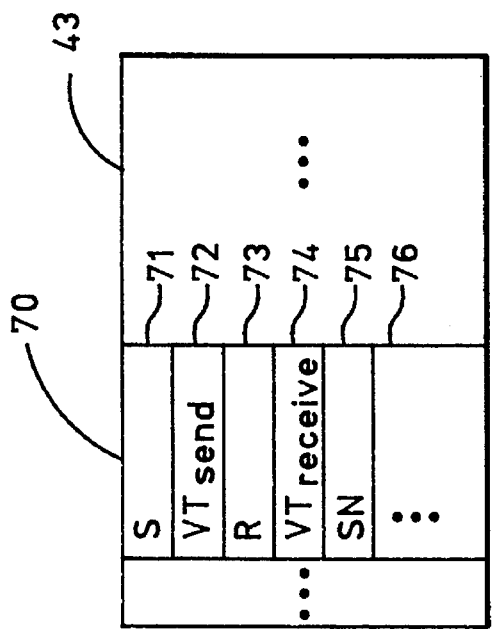
FIG. 2 illustrates the format of a message transmitted between a sending and a receiving processor. The message includes a message sequence number field (SN).

In this invention, a message has the format of the message 70 in FIG. 2. The message 70 is shown residing in an event queue 43. The message includes fields 71–76. In message field 71, the identification of the sending processing node (S) is entered by the sender. The virtual time at S when the message was sent ($VT_{send}$) is entered at the sending processing node in field 72. Identification of the receiving processing node (R) is entered in field 73. The sending processing node enters a value for virtual time ($VT_{receive}$) in field 74 which indicates a "receive" time at which the receiving node must execute an event which the message defines. The message sequence number attached to the message 70 (SN) is entered by the sending processing node in field 75. Reference numeral 76 denotes multiple fields for other status information and message data.

Message Sequence Number Control

In parallel implementation of a virtual time system according to FIG. 1, it is postulated that there is a finite range of sequence numbers to draw from for messages. This range is called "sequence number range". The inventors define M to be the size of the sequence number range. Sequence numbers in the sequence number range run from 0 to M-1 and are generated in a monotonically changing (increasing) sequence until wrap-around occurs at M. IF the last generated number in the sequence is n, the next sequence number will be (n+1) modulus M. In most systems, M will correspond to $2^m$, where m is the number of bits allocated in the message for the message sequence number. However, in the general case, M is in finite, positive number. Nevertheless, the invention employs a simplified implementation obtained when M is the power of 2.

Figure 3:
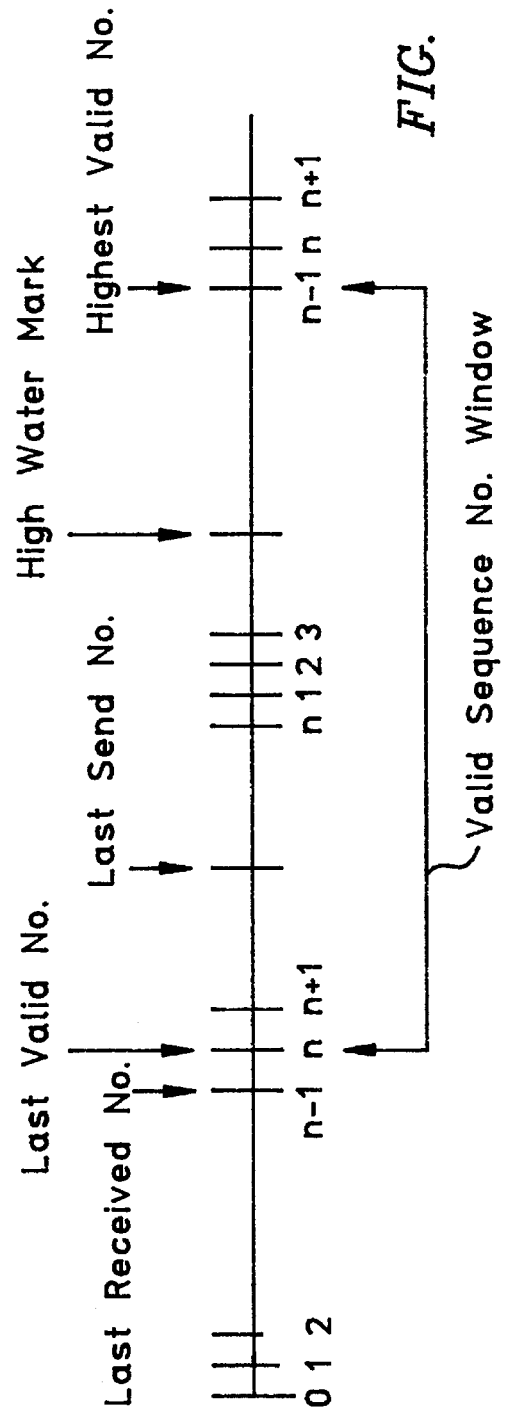
FIG. 3 illustrates a valid window positioned with respect to a finite sequence in the form of a sequence number line.

Central to the sequence number processing of the invention is the "valid window". The valid window defines the range of sequence numbers that can be generated without duplicating the sequence number of an intransit message. Shown in FIG. 3, the valid window is delimited at the low end by "LeastValidNumber" and at an upper end by "HighestValidNumber." Size of the valid window is by definition M. The least and highest valid numbers are related as follows:

$$LeastValidNumber=(HighestValidNumber+1) \text{ modulus } M$$

It is observed that although the LeastValidNumber indicates the beginning of the valid window and the HighestValidNumber indicates the end, the LeastValidNumber is not necessarily numerically less than HighestValidNumber. In addition to the valid window, the method of controlling message sequence numbers according to the invention uses a variable LastSendNumber to record the last number that was generated and the variable HighWaterMark to indicate a point at which there is the danger of running out of valid sequence numbers.

As message sequence numbers are generated, the LastSendNumber moves from the LeastValidNumber to the HighestValidNumber. The set of sequence numbers available to the message sequence number generator 44, therefore diminishes as sequence numbers are generated. In order to move the valid window forward and provide a new set of message sequence numbers, the sending and receiving processors must periodically synchronize. In the general case, the sending processor may perform the synchronization by querying the receiving processor about the LRSN which the receiving processor maintains for the sending processor. Once the sending processing node has obtained the LRSN from the receiving processing node, it can update the valid window. All sequence numbers of messages sent prior to the LRSN have been received and can be reused. The sending processing node, therefore, updates the valid window as follows:

$$LeastValidNumber=(LastReceivedNumber+1) \text{ modulus } M \text{ HighestValidNumber}=LastReceivedNumber$$

In the specific case of virtual time operation, the valid window is synchronized by extending the use of GVT processing. As already stated, GVT calculation is periodically performed in virtual time system operation and involves the communication of LRSN from a receiving processor to a sending processor (Lin et al., op. cit.). Each time a LRSN is communicated during normal GVT processing, the receiving processing node updates the valid window, and a new set of sequence numbers is available to the message sequence number generator 44. If GVT processing occurs regularly, valid numbers will always be available throughout the course of system operation. However, GVT processing can lag behind the activity of message sequence number generation. In this case, the message sequence number generator 44 is in danger of running out of valid sequence numbers and may itself call for GVT processing. The point at which the message sequence number generator 44 calls for GVT processing is marked with the variable HighWaterMark. The HighWaterMark is updated each time the valid window is updated; this point is set to allow sufficient time for GVT processing to complete before a message sequence number generator 44 runs out of valid sequence numbers.

The message sequence number generator 44 includes three functions:
1. Next number generation;
2. Valid window adjustment; and
3. Number comparison.

Next Number Generation

The logic employed by the message sequence number generator 44 generates the next sequence number for a message to a particular receiving processing node by incrementing the LastSendNumber and taking the modulus of this number over M. Next, the logic checks whether the HighWaterMark or the HighestValidNumber is reached. If the HighWaterMark is reached, a call is made to GVT processing; alternatively, another valid window synchronization processing may be invoked. If the new number is equal to the HighestValidNumber, the logic suspends operation at the sending processing node until window synchronization is finished and the valid window has been moved forward. The generation of the next sequence number is illustrated in pseudo-code by the function GetNextNumber ().

Function: GetNextNumber()
1- LastSendNumber=(LastSendNumber+1) modulus M
2- if (LastSendNumber equals HighWaterMark){
3- Invoke a GVT calculation or other valid window synchronization
4- }
5- if (LastSendNumber equals HighestValidNumber){
6- Suspend simulation until the valid window is moved forward
7- }
8- return(LastSendNumber)

Figure 4:
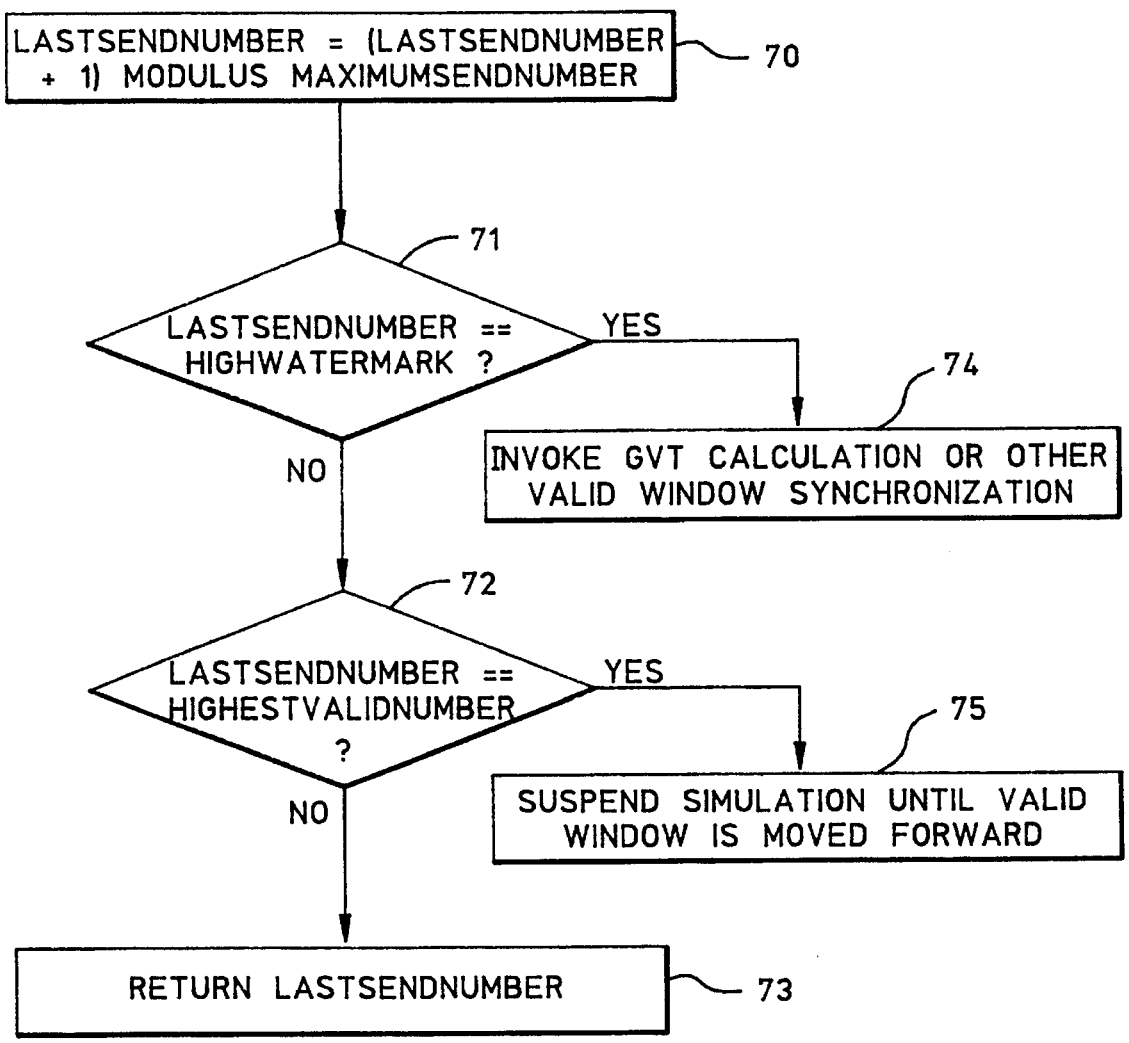
FIG. 4 forms a flow chart which illustrates sequence number processing according to the invention.

The GetNextNumber logic is illustrated in the process flow diagram of FIG. 4. Initially, the logic, in logic block 70, determines the sequence number to be assigned to a message that is to be sent by incrementing the sequence number of the last sent message (LastSendNumber) by 1 and taking the modulus of the sum over a value MaximumSendNumber which in this case is M. In logic block 71, a current value of LastSendNumber is tested against the HighWaterMark. If the HighWaterMark has not been reached, the LastSendNumber is tested in logic block 72 against the HighestValidNumber, and, if the upper end of the valid window has not been reached, LastSendNumber is returned in logic block 73 to the message handler 41 for entry in the serial number field of the current message. If in logic block 71, the HighWaterMark has been reached, GVT processing 48 is invoked to synchronize the sending and receiving processing nodes for movement of the valid window. If, in logic block 72, the HighestValidNumber has been reached, processing at the sending processing node is quiesced until the valid window is moved forward in logic block 75.

The logic of GetNextNumber allows M to be any positive integer. In practice, however, M would be chosen such that $M=2^m$, where m is the number of bits reserved in a message for the sequence number. If $M=2^m$, the modulus operation in line 1 of GetNextNumber can be replaced with a bit-wise AND operation with the value $(2^m-1)$. The implementation of line 1 of GetNextNumber will in this case simplify as follows:

$$LastSendNumber=(LastSendNumber+1) AND\ M',$$

where M' is a constant equal to $(2^m-1)$.

The implementation can be further simplified if LastSendNumber is an unsigned integer of m bits such that $M=2^m$. In this case, LastSendNumber will wrap around by itself when is reaches M and the modulus for AND operation can be removed altogether. The implementation of line one of GetNextNumber will then be as follows:

$$LastSendNumber=LastSendNumber+1.$$

This implementation of GetNextNumber requires only one addition operation and two comparison operations. The generation of message sequence numbers by the message sequence number generator 44 in this case is implemented very efficiently.

Valid Window Adjustment

Figure 5:
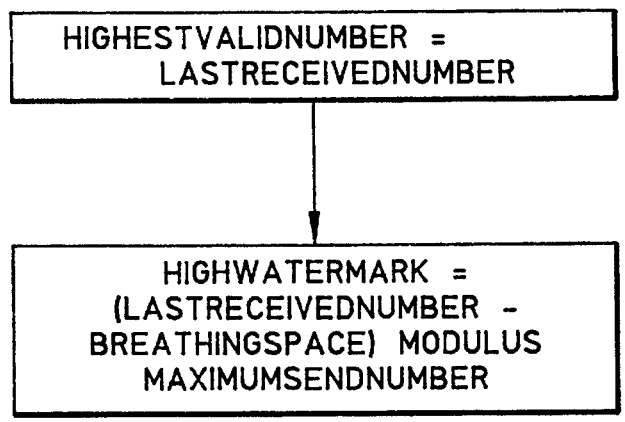
FIG. 5 forms a flow chart illustrating how the valid window is updated according to the invention.

When the message sequence number generator 44 receives a LastReceivedNumber, it updates its valid window pointers accordingly. When the valid window is moved, the HighWaterMark is also updated. The function for adjusting the valid window is shown in the flow diagram of FIG. 5 and below in pseudo-code:
Function: UpdateValidWindow(LastReceivedNumber)
1. HighestValidNumber=LastReceivedNumber;
2. HighWaterMark=(LastReceivedNumber−BreathingSpace) modulus M.

The variable BreathingSpace is a constant that specifies how many sequence numbers will be left in the valid window when the message sequence number generator 44 invokes GVT processing 48 or any other window synchronization process. As in the GetNextNumber, the modulus operation in line 2 can be replaced with a bit-wise AND operation or can be eliminated, depending on how M is chosen.

Number Comparison

In virtual-time operations, all messages that are in-transit must be detected during the GVT processing. This is performed in the message sequence number generator 44 by determining the relative generation order of the sequence number of the last received message and the sequence number of the messages sent to the receiving processing node since the last calculation of GVT. If an infinite range of sequence numbers were used, the relative generation order of two numbers would be determined simply by comparing their numeric values as Lin and Lazowska have set forth in the cited reference. In an actual implementation with a finite range, sequence numbers wrap around. Therefore, the numeric value of a more recently generated sequence number can be smaller than the numeric value of an older sequence number. The relative generation times of two sequence numbers cannot be directly determined from their numeric values.

The invention employs normalization of the sequence numbers against the valid window to determine the relative generation time of two message sequence numbers. The comparison of a message sequence number with LRN is performed before the valid window is updated. By definition, all numbers generated since the last GVT update fall between the LeastValidNumber and the HighestValidNumber of the valid window. Since the valid window has not yet been updated with the LastReceived Number, this number also falls within the range of the valid window. Furthermore, if a number a was generated before number b, number a will occur earlier in the valid window, that is, closer to the LeastValidNumber, than b. the normalized value of a sequence number, therefore, indicates its distance to the start of the valid window. Therefore the message generator number 44 executes a function Normalize 0 as follows:

$$Normalize(n)=((n+M)-LeastValidNumber) \text{ modulus } M.$$

If $M=2^m$ the modulus operation can again be replaced with a bitwise AND operation. If $M=2^m$ and n is an unsigned integer of m bits, both the modulus and the addition can be avoided. In the latter case the normalization function reduces to the following:

$$Normalize(n)=n-LeastValidNumber.$$

The message sequence number generator 44 then performs a normalization function which guarantees that if sequence number a was generated before sequence number b, then Normalize(a)<Normalize(b). In this regard, the message sequence number generator 44 determines the relative generation order of two sequence numbers by comparing their normalized numeric values. For example, the relative generation order of LVSN and HVSN are determined when the valid window is repositioned; and, the high watermark is normalized with respect to LVSN when the valid window is repositioned or the breathing space is changed.

The invention presents a novel approach to controlling message sequence numbers that are drawn from a finite range in a virtual time system. The invention employs a valid window to ensure that a message sequence number is not reused before it is received by a receiving processing node. The valid window provides effective message sequence number control and imposes very low overhead. Furthermore, a message sequence number generator according to the invention employs the information communicated during the GVT processing of the system to adjust the valid window. A sufficiently large number range will ensure that the message sequence number generator will rarely need to invoke GVT processing on its own. This further reduces the overhead of the message sequence number control according to the invention. Finally, the message sequence number generator according to the invention supports an efficient and straight-forward method for determining relative ordering of sequence numbers.

Clearly, other embodiments and modifications of the present invention will occur readily to those of ordinary skill in the art in view of these teachings. Therefore, this invention is to be limited only by the following claims, which include all such embodiments and modifications.

For example, the logic in the message sequence number generator which implements the invention may be embodied in hardware in the form of programmed logic arrays (PLAs). Alternatively, the logic precisely describes digital circuitry that can be implemented in the form of digital computer logic in an application-specific integrated circuit (ASIC).

As a further example, any processing node comprising a conventional data processor, including a CPU, memory, I/O, program storage, a connecting bus, and other appropriate components, could be programmed or otherwise designed to facilitate a method which embodies the invention. Such a data processor would include appropriate program means for executing the method. Also, an article of manufacture, such as a pre-recorded disk or other similar data storage device, for use with a data processing system, could include a storage medium and program means recorded thereon for directing the data processing system to facilitate the practice of the method. It will be understood that such apparatus and articles of manufacture also fall within the spirit and scope of the invention.

Clearly, other embodiments and modifications of the present invention will occur readily to those of ordinary skill in the art in view of these teachings. Therefore, this invention is to be limited only by the following claims, which include all such embodiments and modifications.

We claim:

1. A message sequencing apparatus for use in a distributed, virtual time computing system that includes a plurality of parallel processors co-ordinated by global virtual time, the apparatus comprising:

a message facility for formatting a sequence of messages to be sent from a sending processor to a receiving processor;

said messages formatted by the message facility including fields for message sequence numbers, the message sequence number of any message denoting the message's position in the sequence of messages;

facility means coupled to the message facility for obtaining from the receiving processor a message including the message sequence number ("last received sequence number") of a last message received by the receiving processor; and a message sequence number generator coupled to the facility means and responsive to the last received sequence number for providing the message sequence numbers from a finite sequence number range, such that the message sequence number of any message in the sequence of messages is unique with respect to the message sequence numbers of all other messages of the sequence of messages sent to the receiving processor since receipt of a message with the last received sequence number by the receiving processor.

2. The message sequencing apparatus of claim 1, wherein the finite sequence number range includes a finite range of monotonically increasing sequence numbers, the number of sequence numbers in the range being M, a finite positive number;

further including:
means for positioning a valid window on the finite range, the valid window containing a range of M finite positive numbers, the valid window having a range extending from a least valid sequence number ("LVSN") in the finite range to a highest valid sequence number ("HVSN")in the finite range, where:

$LVSN=(HVSN+1)$ modulus $M$, and the LVSN is the beginning of the valid window, the HVSN is the end of the valid window, and LVSN<HVSN.

3. The message sequencing apparatus of claim 2, wherein the message sequence number generator further includes means for generating the least valid sequence number in the sequence in response to the last received sequence number (LRN) according to:

$LSVN=(LRN+1)$ modulus $M$.

4. The message sequencing apparatus of claim 3, further including:

a high water mark number in the valid window, less than HVSN; and the message sequence number generator responsive to the high water mark number for obtaining the last received sequence number from the receiving processor.

5. The message sequencing apparatus of claim 4, wherein the high water mark is normalized with respect to the position of the valid window.

6. The message sequencing apparatus of claim 3, wherein the message sequence number generator responds to equality between a message sequence number and HVSN by causing suspension of processing in the sending processor in response to calculation of global virtual time.

7. The message sequencing apparatus of claim 2, wherein LVSN and HVSN are normalized with respect to the position of the valid window.

8. The message sequencing apparatus of claim 7, wherein the high water mark is normalized with respect to the position of the valid window.

9. The message sequencing apparatus of claim 1, further including:

GVT means for obtaining global virtual time ("GVT") at the sending processor;

the facility means being coupled to the GVT means for obtaining the last received sequence number from the receiving processor in response to the GVT means obtaining GVT.

10. The message sequencing apparatus of claim 9, wherein the message facility, the means for obtaining, the message sequence number generator, and the GVT means are located at the sending processor.

11. A method for sequencing messages between processing nodes in a virtual time processing system that includes a plurality of processing nodes co-ordinated by global virtual time, comprising the steps of:

sending a sequence of messages from a sending processing node to a receiving processing node;

formatting the messages by including, in each message, a message sequence number, the message sequence number of any message in the sequence of messages denoting the message's position in the sequence;

obtaining from the receiving processing node the message sequence number ("last received sequence number") of a last message received by the receiving processor; and responsive to the last received sequence number, providing the message sequence numbers from a finite sequence number range, such that the message sequence number of any message in the sequence of messages is unique with respect to the message sequence numbers of all other messages of the sequence of messages sent to the receiving processor since receipt of a message with the last received sequence number by the receiving processor.

12. The method of claim 11, wherein:

the finite sequence number range includes a finite range of monotonically increasing sequence numbers, the number of sequence numbers in the range being M, a finite positive number; and the method further including the steps of:
providing a valid window on the finite range, the valid window containing a range of M finite positive numbers, the valid window having a range extending from a least valid sequence number ("LVSN") in the finite range to a highest valid sequence number ("HVSN") in the finite range, where:

$LVSN=(HVSN+1)$ modulus $M$, and the LVSN is the beginning of the valid window, the HVSN is the end of the valid window, and LSVN<HVSN; and providing the message sequence numbers in sequence, beginning with LVSN.

13. The method of claim 12, further including the step of generating the least valid sequence number in the sequence in response to the last received number (LRN) according to:

$LSVN=(LRN+1)$ modulus $M$.

14. The method of claim 13, further including the steps of:

providing a high water mark number in the valid window less than HSVN; and responsive to the high water mark, obtaining the last received sequence number from the receiving processor.

15. The method of claim 14, further including the step of normalizing the high water mark with respect to the position of the valid window.

16. The method of claim 13, further including the step of:
responsive to equality between a message sequence number and HVSN, suspending processing in the sending processor until global virtual time is calculated.

17. The method of claim 12, further including the step of normalizing LVSN and HVSN with respect to the position of the valid window.

18. The method of claim 17, further including normalizing the high water mark with respect to the position of the valid window.

19. The method of claim 11, further including the steps of:
obtaining global virtual time (GVT) at the sending processor; and
the step of obtaining the message including the last received sequence number being performed in response to obtaining GVT.

20. The method of claim 19, wherein the step of formatting the sequences of messages, the step of obtaining the last received sequence number, the step of generating the message sequence numbers, and the step of obtaining GVT are performed at the sending processing node.

21. A message sequence number generator for use in a sending processing node of a distributed, virtual time computing system which includes a plurality of parallel processing nodes coordinated by global virtual time, comprising:
a generator responsive to a last received sequence number for providing message sequence numbers to be applied to a sequence of messages sent to a receiving processing node, the message sequence numbers being provided from a finite sequence number range, such that the message sequence number of any message in the sequence of messages is unique with respect to the message sequence numbers of all other messages of the sequence of messages sent to the receiving processing node since receipt of a message with a last received sequence number by the receiving processing node; and
means for obtaining a message including the last received sequence number from the receiving processing node, the last received sequence number being the message sequence number of a last message received by the receiving processing node.

22. The message sequence number generator of claim 21, further including:
the finite sequence number range including a finite range of monotonically increasing sequence numbers, the number of sequence numbers in the range being M, a finite positive number; and
the generator including means for positioning a valid window on the finite range, the valid window containing a range of M finite positive numbers, the valid window having a range extending from a least valid sequence number ("LSVN") in the finite range to a highest valid sequence number ("HVSN")in the finite range, where:

$$LSVN=(HVSN+1) \; modulus \; M,$$

and the LVSN is the beginning of the valid window, the HVSN is the end of the valid window, and LVSN<HVSN.

23. The message sequence number generator of claim 22, the generator further including means for generating the least valid sequence number in the sequence in response to the last received sequence number (LRN) according to:

$$LSVN=(LRN+1) \; modulus \; M.$$

24. The message sequence number generator of claim 23, further including:
a high water mark number in the valid window, less than HVSN; and
the means for obtaining message sequence number generator responsive to the high water mark number for obtaining the last received sequence number from the receiving processor.

25. The message sequence number generator of claim 24, wherein the high water mark is normalized with respect to the position of the valid window.

26. The message sequence number generator of claim 23, the generator further including:
means responsive to equality between a message sequence number and HVSN for causing suspension of processing in the sending processing node until global virtual time is obtained.

27. The message sequence number generator of claim 22, wherein LVSN and HVSN are normalized with respect to the position of the valid window.

28. The message sequence number generator of claim 27, wherein the high water mark is normalized with respect to the position of the valid window.

29. A computer usable medium having computer readable program code means embodied therein for generating message sequence numbers for use in a distributed, virtual time computing system that includes a plurality of parallel processing nodes coordinated by global virtual time, the program code means comprising:
generation means responsive to a last received sequence number for providing message sequence numbers for a sequence of messages to be sent from a sending processing node to a receiving processing node, the message sequence numbers being provided from a finite sequence number range, such that the message sequence number of any message in the sequence of messages is unique with respect to the message sequence numbers of all other messages of the sequence of messages sent to the receiving processing node since receipt of the message with the last received sequence number by the receiving processing node; and
means for obtaining from the receiving processing node a message including the last received sequence number, the last received sequence number comprising a message sequence number of a last message received by the receiving processing node.

30. The computer usable medium of claim 29, wherein:
the finite sequence number range includes a finite range of monotonically increasing sequence numbers, the number of sequence numbers in the range being M, a finite positive number; and
the program code means further includes means for positioning a valid window on the finite range, the valid window containing a range of M finite positive numbers, the valid window having a range extending from a least valid sequence number ("LSVN") in the finite range to a highest valid sequence number ("HVSN") in the finite range, where:

$$LVSN=(HVSN+1) \; modulus \; M,$$

and the LVSN is the beginning of the valid window, the HVSN is the end of the valid window, and LVSN<HVSN.

31. The computer usable medium of claim 30, wherein the program code means further includes means for generating the least valid sequence number in the sequence in response to the last received sequence number (LRN) according to:

$$LSVN=(LRN+1) \; modulus \; M.$$

* * * * *